(12) United States Patent
Middelberg

(10) Patent No.: US 7,090,483 B2
(45) Date of Patent: Aug. 15, 2006

(54) DIRECT-DRIVEN EXTRUDER AND PROCESS FOR OPERATING THE SAME

(75) Inventor: Gerhard Middelberg, Lengerich (DE)

(73) Assignee: Windmoeller & Hoelscher KG, Lengerich (DE)

( * ) Notice: Subject to any disclaimer, the term of this patent is extended or adjusted under 35 U.S.C. 154(b) by 261 days.

(21) Appl. No.: 10/178,510

(22) Filed: Jun. 25, 2002

(65) Prior Publication Data

US 2003/0012838 A1    Jan. 16, 2003

(30) Foreign Application Priority Data

Jul. 3, 2001    (DE) .................. 101 32 002

(51) Int. Cl.
*B29C 47/92* (2006.01)
(52) U.S. Cl. ...................... 425/162; 366/100
(58) Field of Classification Search ................ 366/100, 366/601; 425/162; 264/211.21
See application file for complete search history.

(56) References Cited

U.S. PATENT DOCUMENTS

| | | | | |
|---|---|---|---|---|
| 3,369,636 A | * | 2/1968 | Nelson | 477/5 |
| 3,478,237 A | * | 11/1969 | Faxon | 310/68 R |
| 3,734,257 A | * | 5/1973 | Eastcott | 192/87.13 |
| 4,078,454 A | * | 3/1978 | Murakami et al. | 100/145 |
| 4,136,580 A | * | 1/1979 | Brand et al. | 74/665 GA |
| 4,249,877 A | * | 2/1981 | Machen | 425/204 |
| 4,741,264 A | * | 5/1988 | McPeak | 99/483 |
| 4,761,588 A | * | 8/1988 | Youcef-Toumi et al. | 318/46 |
| 4,824,255 A | * | 4/1989 | Wohlrab | 366/78 |
| 5,306,452 A | * | 4/1994 | Todd | 264/102 |
| 5,485,046 A | * | 1/1996 | Kaplan et al. | 310/166 |
| 6,002,193 A | * | 12/1999 | Canini et al. | 310/268 |
| 6,106,426 A | * | 8/2000 | Morhard et al. | 475/6 |
| 6,298,751 B1 | * | 10/2001 | Ide et al. | 74/665 GA |
| 6,909,215 B1 | * | 6/2005 | Bryant | 310/114 |
| 2001/0027146 A1 | * | 10/2001 | Spaziani et al. | 477/3 |
| 2002/0064084 A1 | * | 5/2002 | Meyer | 366/100 |
| 2002/0076465 A1 | * | 6/2002 | Knauff et al. | 425/542 |
| 2003/0192400 A1 | * | 10/2003 | Cordeiro | 74/665 A |

FOREIGN PATENT DOCUMENTS

DE          199 31 147        7/2000

* cited by examiner

*Primary Examiner*—Mark Eashoo
(74) *Attorney, Agent, or Firm*—Jacobson Holman PLLC

(57) ABSTRACT

An extruder which converts preferably granular plastic material into the melted state and which includes an extruder screw rotating within a cylinder and connected to a drive unit having a motor and at least one rotor so that the drive unit provides torque for rotary motion of the extruder screw. The extruder screw and the rotor exhibit the same speed in operation.

17 Claims, 1 Drawing Sheet

DIRECT-DRIVEN EXTRUDER AND PROCESS FOR OPERATING THE SAME

BACKGROUND OF THE INVENTION

1. Field of the Invention

The invention relates to an extruder that converts preferably granular plastic material into the melted state and which includes at least one cylinder in which an extruder screw rotates, which is connected with a drive unit to at least one motor so that the drive unit provides the torque for the rotary motion of the extruder screw, the motor being allocated one or more rotors. The invention also relates to a process for operating such an extruder.

2. Description of the Related Art

Plastic film extruders of the above-described type are used usually to convert plastic raw material into a melted state, which is suitable for further processing. These extruders are used predominantly in extrusion lines, as also presented in the DE 199 31 147.

The extruder screws are driven with drive units, which are connected either rigidly to the extruder screws via drive unit mechanisms, or impart with the extruder screws the necessary torque via a chain or belt connection.

The drives used in both cases are expensive and have a large space requirement.

Therefore, the object of the present invention is to propose a device and a process that render these drives superfluous.

SUMMARY OF THE INVENTION

The problem is solved by means of an extruder that converts preferably granular plastic material into the melted state and which includes at least one cylinder in which an extruder screw rotates. The extruder screw is connected with a drive unit to at least one motor so that the drive unit provides the torque for the rotary motion of the extruder screw, the motor being allocated at least one rotor and the extruder screw and the rotor exhibiting the same speed in operation.

Due to the usually large torque requirement of the extruder screw it is advantageous to provide a drive unit comprising several motors, which can be economical standard drive components. In the interim it is customary in the construction of electric motors to generate high moments and here primarily high starting torques by means of highly polar synchronous or asynchronous motors.

However, in general the use of direct current drives is also possible.

Even such motors could be coupled together in order to provide adequate torque. In coupling these modularly built drive units, quick disconnect connecting means can be used in order to react, for example, quickly to changes in the requirements imposed on the torque to be made available, but also to save assembly time. Such connections can also include belts or chains. In arrangements using belts or chains to transfer the torque, the axes of rotation of the rotors and of the extruder screw are not usually in alignment.

Some examples of connecting means, which facilitate the alignment of the axes of rotation of different rotatable components that are to be connected (rotors and extruder screw), are functional pairs of hollow shafts and pins. However, the irreversible connection of rotatable components or the use of rotors and screws made from one piece is also regarded as relating to the invention.

When using electric motors, it is adequate to couple the different motors—preferably in parallel—to a common power supply, which can comprise a frequency converter.

However, it is also possible to use different frequency converters. In this respect the speed of the motor can be controlled; and in the control hierarchy of the different motors, said motor can act as the master. As the control variable for the speed, the melt pressure in the extruder cylinder can be used, for example.

In such a case the current and/or the torque of the other motors can be controlled or regulated; and the other motors can act as slaves.

BRIEF DESCRIPTION OF THE DRAWINGS

Other advantageous embodiments and applications of the invention follow from the other claims, the description of the subject matter and the drawings. The individual figures depict the following.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
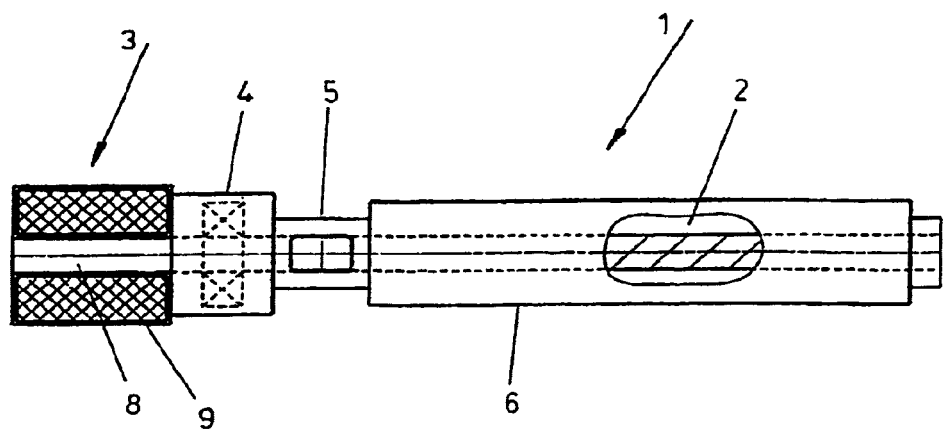
FIG. 1 is a side view of an extruder with a drive unit that comprises one motor.

FIG. 1 depicts an embodiment of an inventive extruder 1, which exhibits a cylinder 6, in which an extruder screw 2 rotates. The extruder screw 2 is held by the bearing 4. The extruder screw 2 is connected rigidly to the rotor 8 of the drive unit 3, which in this embodiment consists of a motor 9. The connecting means of the rotor 8 and the screw 2, which consist here of a pin and a hollow shaft, are not illustrated here. In operation granular plastic material of the extruder is fed via a hopper (not shown here) into the hopper member 5. The plastic melt is extruded via the short extrusion connecting piece 7 and fed usually via suitable feed lines to a plastic film blow head. The latter two components of a blown film extrusion line are not depicted here.

Figure 2:
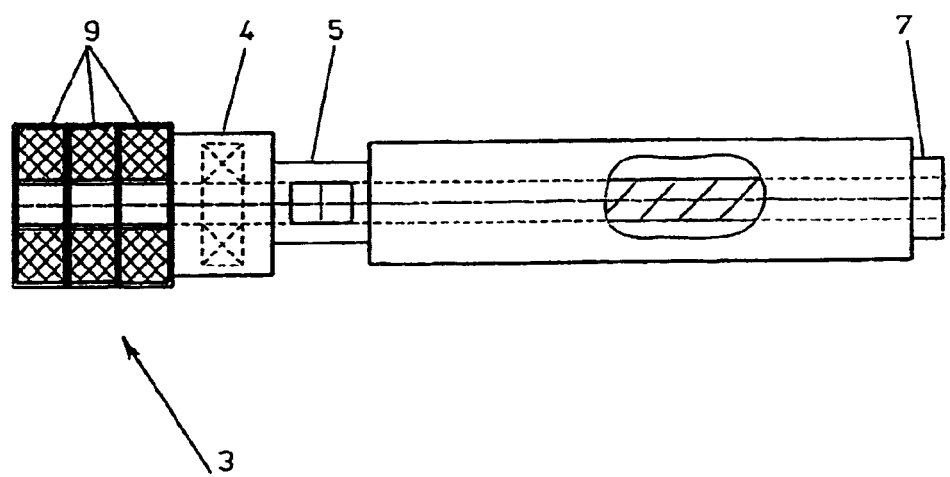
FIG. 2 is a side view of an extruder with a drive unit that comprises three motors.

FIG. 2 shows an equivalently constructed extruder 1, whereby the drive unit 3 comprises here three disk-shaped motors 9, which are arranged in a row and which provide jointly the torque necessary for the rotary motion of the extruder screw. For the purpose of this application a rotor (8) of a motor (9) is considered as the disk armature, when the ratio between the length and the diameter is at least 1:1. The use of such disk armatures is advantageous to generate a high torque for a limited overall length of the drive unit (3).

In both embodiments electric motors are used as the motors (9). A presentation of the electric feed lines and other power supply devices, such as the frequency converters, was also waived.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. An extruder converting granular plastic material into a melted state, said extruder comprising an extruder screw rotating within a cylinder and being connected to a drive unit having a plurality motors with each of said motors having at least one rotor so that the drive unit provides torque for rotary motion of said extruder screw, said extruder screw and said rotors configured in a direct-drive relationship thereby exhibiting a same speed in operation, and a speed of one of the plurality of motors being controlled within a control hierarchy, said controlled motor being a master in said control hierarchy and the other motors within said plurality of motors being slaves controlled according to torque or current.

2. The extruder as set forth in claim 1, wherein axes of rotation of the rotors of at least two of said plurality of motors are in substantially axial alignment.

3. The extruder as set forth in claim 1, wherein axes of rotation of the rotors of at least two of said plurality of motors and an axis of rotation of said extruder screw are in substantially axial alignment.

4. The extruder as set forth in claim 1, wherein at least one part of at least one of said rotors and one part of the extruder screw are connected together with a quick-disconnect connection.

5. The extruder as set forth in claim 1, wherein at least one part of at least one of said motors is provided with disk-shaped rotors.

6. The extruder as set forth in claim 1, wherein said plurality of motors are electric motors.

7. The extruder as set forth in claim 1, wherein said plurality of motors are asynchronous electric motors.

8. The extruder as set forth in claim 1, wherein at least one part of each of said motors is attached to a common frequency converter.

9. The extruder as set forth in claim 1, wherein the extruder is part of an extrusion line.

10. The extruder as set forth in claim 1, wherein said plurality of motors are arranged in a row.

11. The extruder as set forth in claim 10, wherein said plurality of motors are disc-shaped with substantially axially aligned axes of rotation.

12. An extruder comprising an extruder screw rotating within a cylinder and being connected to a drive unit having a plurality of motors arranged adjacent one another, each of said motors having at least one rotor so that the drive unit provides torque for rotary motion of said extruder screw, said extruder screw and said rotors configured in a direct-drive relationship thereby exhibiting a same speed in operation, said extruder configured to convert granular plastic material into a melted state and output or input variables of said plurality of motors being controlled based on at least one state variable of said extruder selected from the group consisting of melt throughput of the extruder and melt pressure in the cylinder of the extruder.

13. The extruder as set forth in claim 12, wherein axes of rotation of the rotors of at least two of said plurality of motors are in substantially axial alignment.

14. The extruder as set forth in claim 12, wherein axes of rotation of the rotors of at least two of said plurality of motors and an axis of rotation of said extruder screw are in substantially axial alignment.

15. The extruder as set forth in claim 12, wherein at least one part of at least one of said motors is provided with disk-shaped rotors.

16. The extruder as set forth in claim 12, wherein said plurality of motors are arranged in a row.

17. The extruder as set forth in claim 16, wherein said plurality of motors are disc-shaped with substantially axially aligned axes of rotation.

* * * * *